(12) United States Patent
Mansfield

(10) Patent No.: US 11,498,665 B2
(45) Date of Patent: Nov. 15, 2022

(54) AIRCRAFT LANDING GEAR SHOCK ABSORBER ASSEMBLY

(71) Applicant: SAFRAN LANDING SYSTEMS UK LTD, Gloucester (GB)

(72) Inventor: Ricky Peter Mansfield, Gloucester (GB)

(73) Assignee: Safran Landing Systems UK LTD

( * ) Notice: Subject to any disclaimer, the term of this patent is extended or adjusted under 35 U.S.C. 154(b) by 521 days.

(21) Appl. No.: 16/704,200

(22) Filed: Dec. 5, 2019

(65) Prior Publication Data

US 2020/0239132 A1     Jul. 30, 2020

(30) Foreign Application Priority Data

Dec. 18, 2018 (EP) ...................................... 8213498

(51) Int. Cl.
| | | |
|---|---|---|
| *B64C 25/60* | (2006.01) | |
| *F16F 9/06* | (2006.01) | |
| *F16F 9/58* | (2006.01) | |

(52) U.S. Cl.
CPC .............. *B64C 25/60* (2013.01); *F16F 9/062* (2013.01); *F16F 9/58* (2013.01); *F16F 2222/12* (2013.01); *F16F 2224/0241* (2013.01); *F16F 2224/0275* (2013.01)

(58) Field of Classification Search
CPC .......... B64C 25/60; B64C 25/58; F16F 9/062; F16F 9/58; F16F 2222/12; F16F 2224/0241; F16F 2224/0275; F16F 2226/02; F16F 9/063; F16F 9/067
See application file for complete search history.

(56) References Cited

U.S. PATENT DOCUMENTS

| | | | |
|---|---|---|---|
| 2016/0153080 A1 | 6/2016 | Steffens et al. | |
| 2018/0215461 A1* | 8/2018 | Meyer | ..................... B64C 25/02 |

FOREIGN PATENT DOCUMENTS

| | | |
|---|---|---|
| EP | 2848523 A1 | 3/2015 |
| EP | 3360679 A1 | 8/2018 |
| GB | 627104 | 7/1949 |
| GB | 1175735 | 12/1969 |

OTHER PUBLICATIONS

European Search Report for European Application No. 18 213 498.1, dated May 28, 2019, 7 pages.

* cited by examiner

*Primary Examiner* — Yuen Wong

(74) *Attorney, Agent, or Firm* — RatnerPrestia

(57) ABSTRACT

An aircraft landing gear shock absorber assembly having: an outer cylinder having a bore which extends into the outer cylinder, the bore defining an opening in the outer cylinder; a sliding tube having a first end region slidably coupled within the bore and a second end region which projects out of opening; a ground fitting distinct from the sliding tube; and a mechanical fixing arranged to mechanically couple the ground fitting to the second end region of the sliding tube, wherein the sliding tube comprises a tubular body portion formed from a ceramic coated fibre composite tube.

10 Claims, 5 Drawing Sheets

AIRCRAFT LANDING GEAR SHOCK ABSORBER ASSEMBLY

This application claims the benefit of European Application EP 18213498.1, filed on Dec. 18, 2018, which is incorporated herein by reference in its entirety.

BACKGROUND

A known aircraft landing gear shock absorber assembly comprises an outer cylinder having a bore which extends partially through the outer cylinder, and a sliding tube slidably coupled within the bore such that an upper end of the sliding tube is retained in the bore and a lower end of the sliding tube projects out of the bore.

In a single axle landing gear assembly the lower end of the sliding tube is provided with an axle to carry one or a pair of wheel and brake assemblies. In a multi axle landing gear assembly the lower end of the sliding tube can comprise a forked yoke or other end fitting arranged to be attached to part of a wheel assembly, such as a bogie beam. Such end fittings as described above will for brevity collectively be referred to as "ground fittings".

It is known to manufacture a sliding tube and ground fitting separately from one another and then couple them together using one or more mechanical fixings such as nuts and bolts. Such mechanical fixings can include brackets, collars and the like to facilitate a mechanical coupling between the sliding tube on the one hand and the ground fitting on the other hand. While such two part assemblies can result in a cost effective assembly that is simple to manufacture, the weight of the mechanical fixing increases the overall weight of the landing gear assembly.

It is therefore known to instead form the sliding tube and ground fitting as a single piece; for example, machining the sliding tube and axle from a single billet of metal. While this can reduce the weight of the landing gear assembly in comparison to a multi part arrangement as described above, it can increase the cost and complexity of manufacture.

The present inventor has recognised that aircraft landing gear shock absorber sliding tubes can be improved in terms of weight, cost and complexity to manufacture in comparison to known assemblies.

SUMMARY

According to a first aspect of the invention, there is provided an aircraft landing gear shock absorber assembly having: an outer cylinder having a bore which extends into the outer cylinder, the bore defining an opening in the outer cylinder; a sliding tube comprising a first end region slidably coupled within the bore and a second end region which projects out of the opening; a ground fitting distinct from the sliding tube; and a mechanical fixing arranged to mechanically couple the ground fitting to the second end region of the sliding tube. The sliding tube comprises a tubular body portion formed from a ceramic coated fibre composite tube.

Thus, the shock absorber assembly according to the first aspect includes a multiple part sliding tube and ground fitting assembly in which the tubular member of the sliding tube is formed from a fibre composite tube with a ceramic coating defining an outer surface. The present inventor has identified that the ceramic coating of such a tubular member can provide a suitable counter face for the lower bearing of an aircraft landing gear shock absorbing strut outer cylinder. Advantageously, the weight saving provided by the fibre composite element of the sliding tube can be greater than the weight added by the overlapping parts and additional fixings required to enable the ground fitting to be formed separately and mechanically coupled to the sliding tube. Thus, landing gear assemblies according to embodiments of the invention possess the advantages of multi piece design while having the capability of being at least as lightweight as assemblies in which the sliding tube and ground fitting are integrally formed from a single piece of metal. The lightweight nature of the sliding tube can also reduce the unsprung mass in comparison to known assemblies.

Optional features of the shock absorber assembly are set out in the dependent claims.

According to a second aspect of the invention, there is provided an aircraft landing gear assembly including a shock absorber assembly according to the first aspect.

According to a third aspect of the invention, there is provided an aircraft including one or more aircraft landing gear assemblies according to the second aspect.

BRIEF DESCRIPTION OF THE DRAWINGS

Embodiments of the invention will now be described with reference to the accompanying drawings, in which.

DETAILED DESCRIPTION

Figure 1:
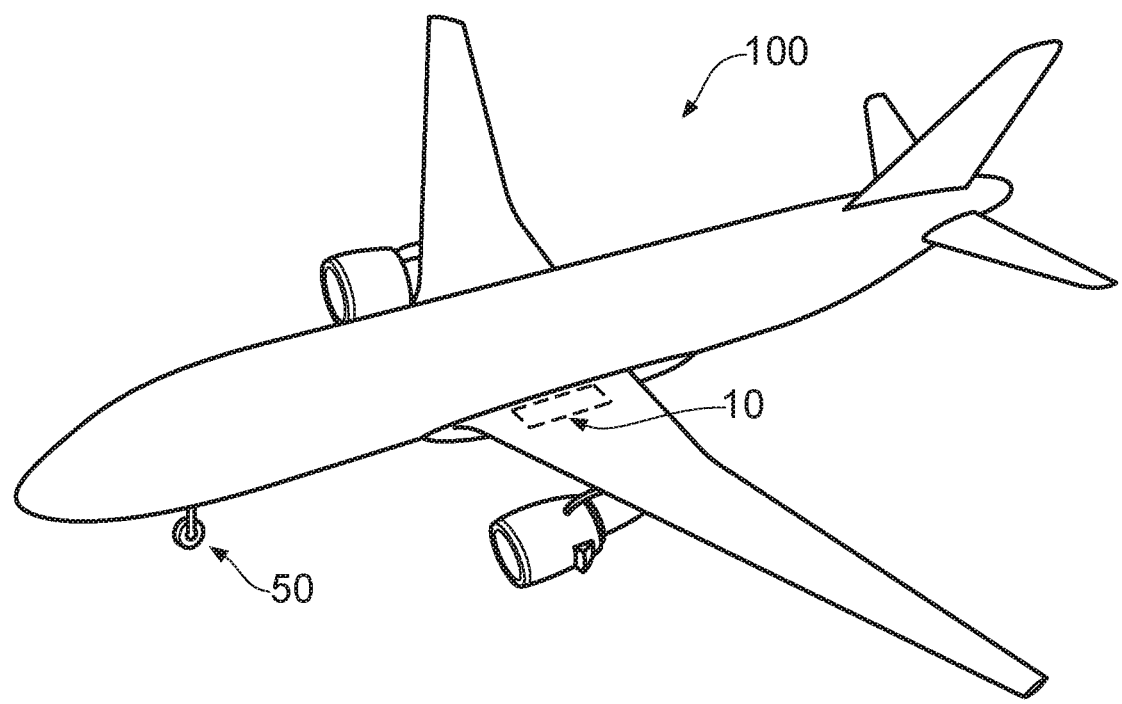
FIG. 1 is a schematic diagram of an aircraft according to an embodiment of the invention.

Referring to FIG. 1, an aircraft according to an embodiment of the invention is shown generally at 100. The aircraft 100 includes a plurality of main landing gear assemblies 10 according to embodiments of the invention and a nose landing gear assembly 50 according to an embodiment of the invention.

Figure 2:
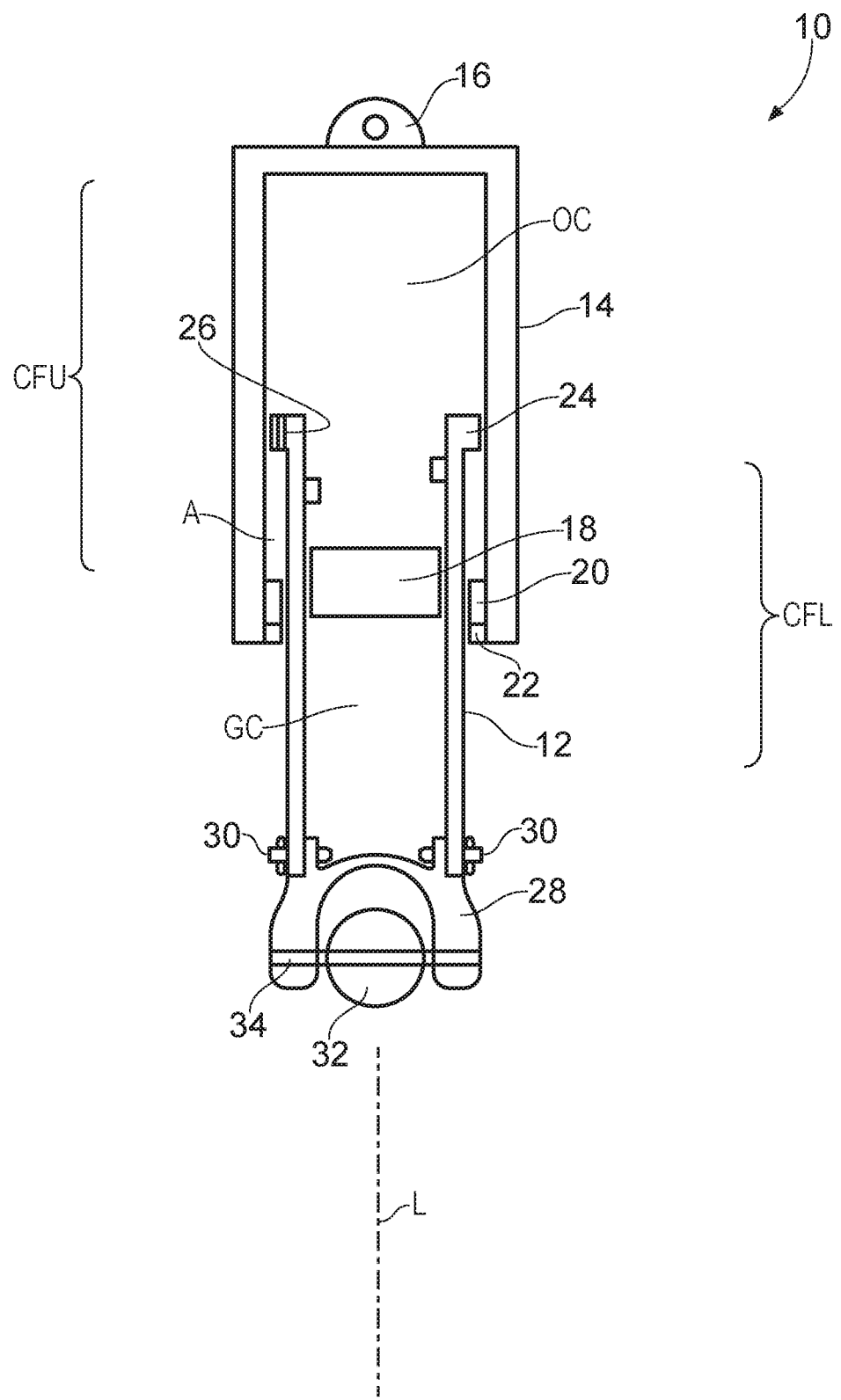
FIG. 2 is a schematic cross section diagram of a landing gear assembly according to an embodiment of the invention.

FIG. 2 is a schematic cross section diagram of a main landing gear assembly 10 according to an embodiment of the invention.

The landing gear assembly 10 comprises an 'oleo-pneumatic' shock absorber which defines a shock absorbing strut of the landing gear. The oleo-pneumatic shock absorber includes a hydraulic fluid, such as oil, and a gas such as nitrogen, which provide spring and damping characteristics.

The shock absorber comprises an inner housing portion 12, having an inner end region which is slidably coupled and housed within an outer housing portion 14. The inner housing portion 12 is known in the art as a 'slider', 'sliding tube', 'inner cylinder', or 'piston', and the outer housing portion 14 is known as an 'outer cylinder', or 'main fitting', which includes a main pivot bearing lug 16 via which the shock absorber is arranged to be pivotally coupled to the aircraft 100 to pivot between a deployed condition for take-off and landing and a stowed condition for flight. However, in other embodiments, the main strut can be rigidly fixed to the aircraft i.e. not form a retractable gear.

The sliding tube 12 and outer cylinder 14 together define an internal cavity or chamber OC, GC which contains shock absorber fluid. In the illustrated embodiment the chamber OC, GC is split into an oil chamber OC defined mainly by the outer cylinder 14, which contains oil, and a gas chamber GC, defined mainly by a bore extending along the sliding tube 12, which contains a gas such as nitrogen. A separator piston 18 is slidably housed within the bore of the sliding tube 12 to slide along the longitudinal axis L of the shock absorber. In other embodiments the oil and gas can be unseparated.

The region where the sliding tube 12 and outer cylinder 14 overlap defines an annulus A between adjacent surfaces of the sliding tube 12 and outer cylinder 14. The annulus A varies in size in accordance with the extension state of the shock absorber. The term "annulus" can mean a ring-like space which has a cylindrical or non-cylindrical cross sectional profile.

An annular ring 20 is housed within the annulus A, adjacent to the open end of the outer cylinder 14. The annular ring 20 defines a lower bearing of the shock absorber which carries one or more dynamic seals (not shown) which act upon the outer surface of the sliding tube 12 to confine the shock absorber fluid to the oil chamber OC. For example, a pair of dynamic seals can be mounted on the inner cylindrical face of the annular ring 20 and arranged such that one or both of them press against the sliding tube 12 as the shock absorber extends and retracts, inhibiting the passage of shock absorber fluid from the chamber OC to the outside environment. A pair of static seals can be mounted on the outer cylindrical face of the annular ring 20 to bear against the corresponding inner face of the outer cylinder 14 to inhibit the passage of shock absorber fluid from the chamber OC to the outside environment. The annular ring 20 can be locked in place within the annulus A between a shoulder portion of the outer cylinder 14 and a gland nut 22 which is screwed into engagement with a threaded end portion of the inner surface of the outer cylinder 14. In order to prevent dirt and other contaminants from entering the annulus A, an outer environmental seal known in the art as a scraper seal or an extruder seal can be provided. The scraper seal can be mounted in a groove formed in the inner surface of the gland nut 22 between an outer flange and an inner flange so that its position is fixed relative to the outer cylinder 14.

The upper end region of the sliding tube 12, which is housed within the outer cylinder 14, is radially enlarged to define a piston shaped upper bearing 24 arranged to act in sliding engagement with an inner surface of the outer cylinder 14 as the shock absorber extends and retracts. The upper bearing 24 can include one or more conventional orifices 26 or snubber holes arranged to provide damping as oil passes through them between the oil chamber OC and annulus A as the shock absorber extends and retracts. Alternatively, the upper bearing can be defined by the inner side wall of the outer cylinder and arranged to act on the upper portion of the sliding tube.

Thus, the shock absorber assembly can extend and retract between maximum and minimum extension states, the shock absorber including first and second bearings 20, 24 axially spaced from one another along the longitudinal axis L of the shock absorber, each bearing 20, 24 being arranged to move in sliding engagement with respective first and second counter face portions CFL, CFU of the sliding tube or outer cylinder as the shock absorber assembly extends and retracts between the maximum and minimum extension states.

Figure 3:
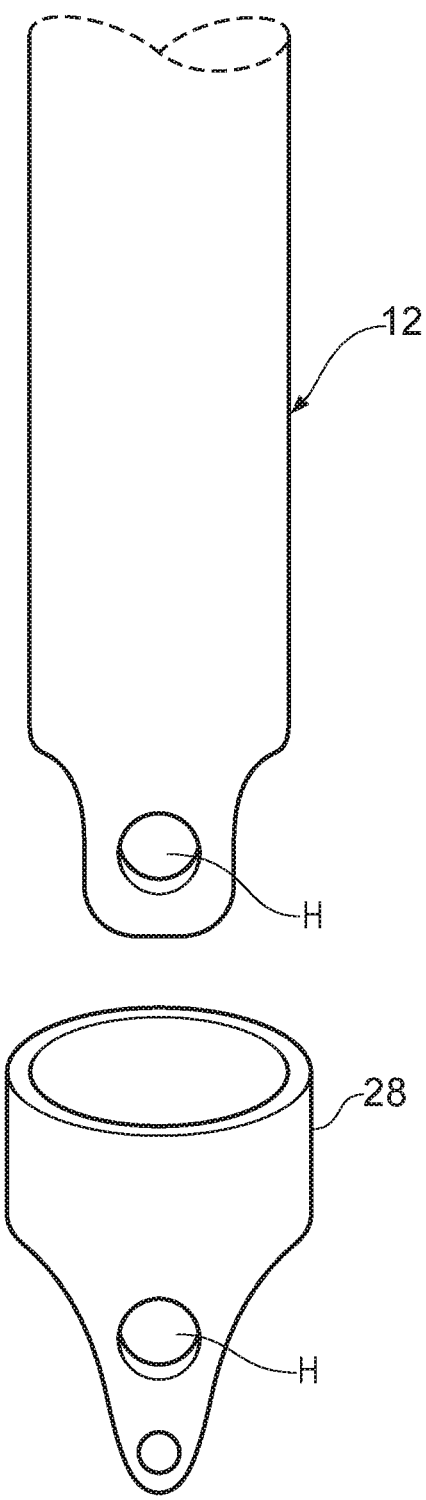
FIG. 3 is a schematic diagram of part of the sliding tube and the ground fitting of the landing gear assembly of FIG. 1.

Referring additionally to FIG. 3, a lower end region of the sliding tube 12, which remains outside of the outer cylinder 14, is coupled to a ground fitting. In this embodiment the ground fitting is a forked yoke 28. The forked yoke 28 is arranged to be mechanically coupled to the lower end of the sliding tube 12 via a mechanical fixing comprising a nut and bolt assembly 30 which extends through holes H in the sliding tube 12 and forked yoke 28 to hold the forked yoke 28 in a substantially fixed orientation and position relative to the sliding tube 12. An upper surface of the forked yoke 28 is provided with a bore for receiving the end of the sliding tube 12 such that portions of the yoke 28 and tube 12 overlap and the holes can be axially aligned to receive the mechanical fixing(s). The forked yoke in turn pivotally mounts a bogie beam 32 via a bogie pivot pin 34. As will be appreciated, a bogie beam 32 is an elongate beam arranged to carry a plurality of axles (not shown), each axle carrying a pair of wheel and brake assemblies. In other embodiments the mechanical fixing can comprise the bogie pivot pin 34.

In other embodiments the ground fitting can be any suitable part arranged to enable the sliding tube to be mechanically coupled to a ground contacting assembly such as a wheel or skid assembly.

In other embodiments, the shock absorber can form part of a 'capsule' type shock absorber where the shock absorber is inverted and housed within a distinct main fitting to which the inner housing portion is coupled such that the outer housing portion acts as the sliding tube.

Moreover, in other embodiments any suitable shock absorber can be provided, such as magnetic.

Landing gear assemblies according to embodiments of the invention differ from known landing gear assemblies in that the sliding tube 12 is formed from a fibre composite tube with a ceramic coating. The present inventor has discovered that the ceramic coating of such a tubular member can provide a suitable counter face for the lower bearing 20 of an aircraft landing gear. The ceramic coating can thus provide a load bearing surface for the bearing(s) and a sealing surface for dynamic seals to act against to confine shock absorber fluid to the shock absorber. Advantageously, the weight saving provided by the fibre composite element of the sliding tube 12 can be greater than the weight added by the overlapping parts and additional fixings required to enable the ground fitting 28 to be formed separately and mechanically coupled to the sliding tube 12. Thus, landing gear assemblies according to embodiments of the invention have the advantages of multi piece design while having the capability of being at least as lightweight as assemblies in which the sliding tube and ground fitting are integrally formed from a single piece of metal.

Figure 4:
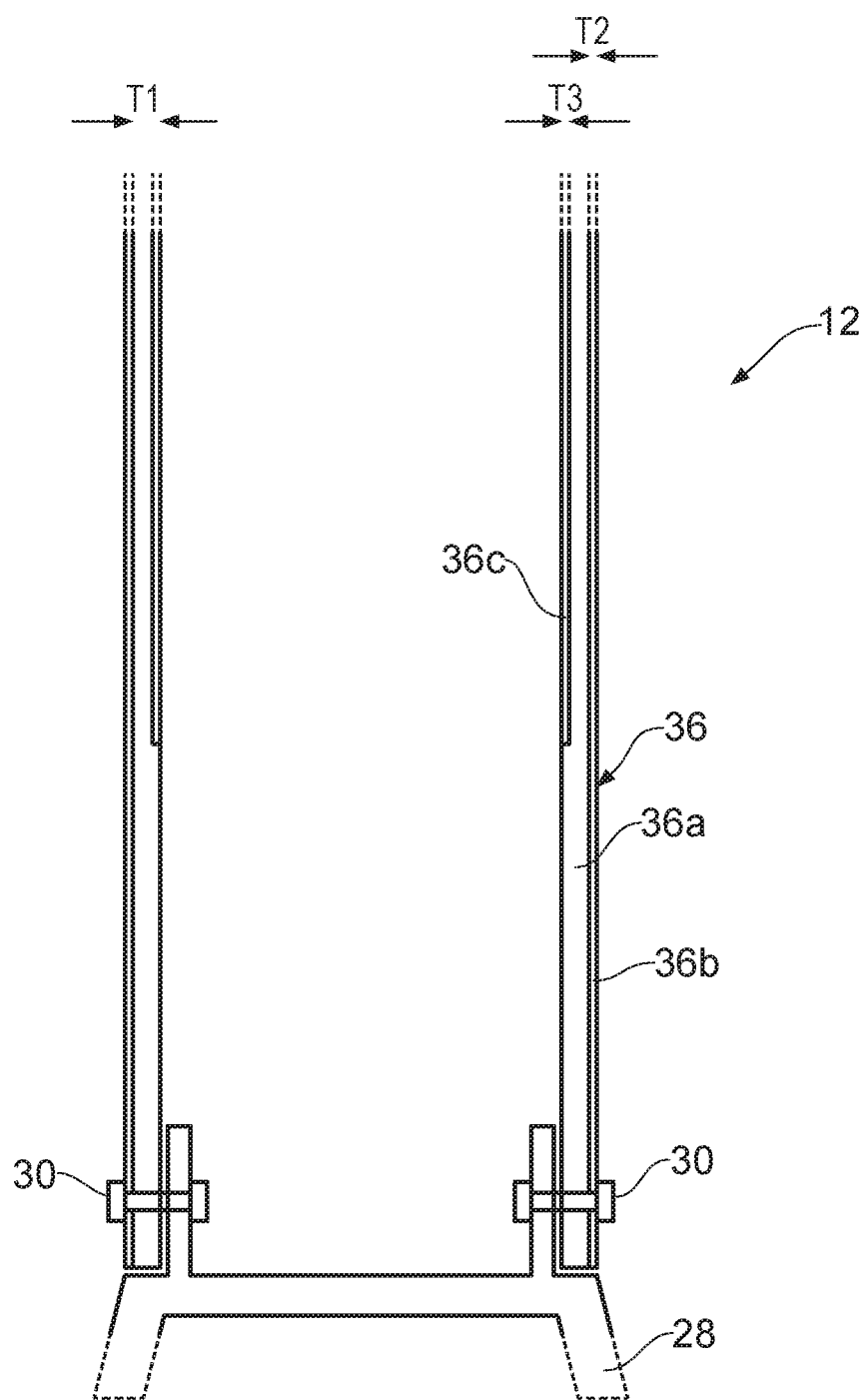
FIG. 4 is a schematic cross section diagram of part of the sliding tube and ground fitting of the landing gear assembly of FIG. 1.

FIG. 4 shows part of the sliding tube 12 in cross section along the longitudinal axis L. The sliding tube 12 comprises a cylindrical body portion 36. The body portion 36 is predominately formed from a tubular substrate 36a of a composite material such as a fibre reinforced plastic in which reinforcing fibres are embedded in a cured plastic matrix. The substrate 36 can comprise or be formed around a metal or plastics tube, although such an arrangement may increase the weight of the assembly. An outer coating 36b of ceramic material is applied to parts of the sliding tube 12 which, in use, will serve as the counter face for the lower bearing 20, and in some embodiments also the upper bearing, as the shock absorber extends and retracts. Some or all of the outer surface of the tubular substrate 36a is coated with ceramic material. Thus, the first counter face portion CFL is defined by the ceramic coated portion of the sliding tube 12. Optionally, some or all of the inner surface of the tubular substrate 36a can be coated with ceramic material; for example, in embodiments comprising a separator piston 18, the region of the inner surface along which the separator piston 18 moves in use. The fibre composite tubular substrate can for example have a thickness T1 in the range of 3 mm-75 mm. The outer ceramic coating can for example have a thickness T2 of 0.0025 mm-0.5 mm. Likewise, the optional inner ceramic coating can for example have a thickness T2 of 0.0025 mm-0.5 mm. The thickness of either or both coating can be uniform along the length of the coating. The ceramic coating(s) can for example comprise an oxide ceramic coating such as titanium dioxide, chromium oxide or aluminium oxide. With the benefit of the present disclosure, the skilled person would be capable of producing suitable sliding tubes; US2016/0153080A1 provides examples of how to form a fibre composite tube with a ceramic coating.

Figure 5:
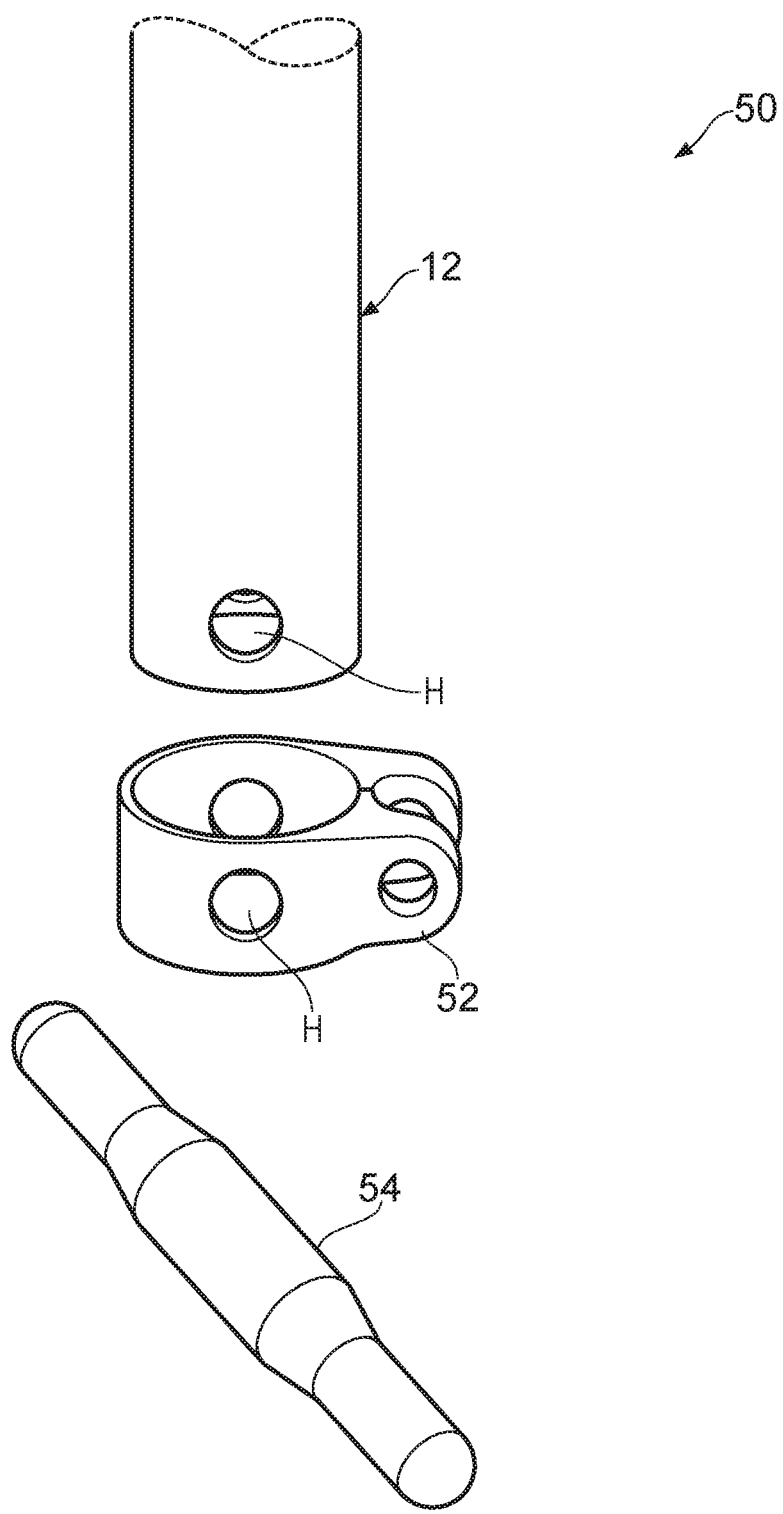
FIG. 5 is a schematic diagram of part of a sliding tube, mechanical and fixing ground fitting of a shock absorber according to a further embodiment of the invention.

FIG. 5 shows part of a single axle landing gear assembly 50, such as a nose landing gear assembly. The sliding tube 12 can be the same or similar to the sliding tube 12 described with reference to FIGS. 2 to 4. This embodiment differs from the embodiment of FIGS. 2 to 4 in that the ground fitting 54 is an axle and the mechanical fixing 52 comprises a collar and nut/bolt assembly (not shown). The axle 54 is inserted through holes H in the collar 52 and sliding tube 12 and the nut/bot assembly tightened to hold the axle 54 in place.

The ground fittings and mechanical fixings used in embodiments of the invention can be conventional in shape and materials.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. The mere fact that certain measures are recited in mutually different dependent claims does not indicate that a combination of these measures cannot be used to advantage.

The invention claimed is:

1. An aircraft landing gear assembly comprising:
    an aircraft landing gear shock absorber assembly comprising:
        an outer cylinder having a bore which extends into the outer cylinder, the bore defining an opening in the outer cylinder;
        a sliding tube comprising a first end region slidably coupled within the bore and a second end region which projects out of the opening;
        a ground fitting distinct from the sliding tube;
        a mechanical fixing arranged to mechanically couple the ground fitting to the second end region of the sliding tube, wherein the sliding tube comprises a tubular body portion formed from a ceramic coated fibre composite tube;
        a main pivot bearing formation via which the shock absorber assembly is arranged to be pivotally coupled to an aircraft to move between a deployed condition and a stowed condition; and
    a ground contacting formation coupled to the ground fitting such that the aircraft landing gear assembly is capable to absorb landing loads and support the weight of the aircraft when the aircraft is on the ground.

2. The aircraft landing gear assembly according to claim 1, wherein the aircraft landing gear shock absorber assembly includes end stops positioned to limit an amount of relative sliding movement between the sliding tube and an outer cylinder such that the aircraft landing gear shock absorber assembly is capable to extend and retract between maximum and minimum extension states, the aircraft landing gear shock absorber assembly including first and second bearings axially spaced from one another along a longitudinal axis of the aircraft landing gear shock absorber assembly, each bearing being arranged to move in sliding engagement with respective first and second counter face portions of the sliding tube or outer cylinder as the aircraft landing gear shock absorber assembly extends and retracts between maximum and minimum extension states, wherein the first counter face portion is defined by a ceramic coated portion of the sliding tube.

3. The aircraft landing gear assembly according to claim 2, wherein the second counter face portion is defined by a ceramic coated portion of the sliding tube.

4. The aircraft landing gear assembly according to claim 1, wherein the ceramic coated fibre composite tube comprises a fibre composite tubular substrate having a first ceramic coating applied to some or all of an outer cylindrical sidewall of the fibre composite tubular substrate.

5. The aircraft landing gear assembly according to claim 4, wherein the fibre composite tubular substrate has a thickness of at least 3 mm and/or wherein the first ceramic coating has a thickness of at least 0.0025 mm.

6. The aircraft landing gear assembly according to claim 4, wherein the ceramic coated fibre composite tube comprises a second ceramic coating applied to some or all of an inner cylindrical sidewall of the fibre composite tubular substrate.

7. The aircraft landing gear assembly according to claim 6, wherein the second ceramic coating has a thickness of at least 0.0025 mm.

8. The aircraft landing gear assembly according to claim 6, wherein the first and/or second ceramic coatings each comprises an oxide ceramic.

9. The aircraft landing gear assembly according to claim 4, wherein the ceramic coated fibre composite tube comprises a plurality of reinforcing fibres embedded in a cured plastic matrix.

10. An aircraft including one or more aircraft landing gear assemblies according to claim 1.

* * * * *